United States Patent
Inoue et al.

(10) Patent No.: US 9,675,951 B2
(45) Date of Patent: Jun. 13, 2017

(54) METHOD FOR TREATING SLURRY AND TREATMENT APPARATUS USED FOR THE SAME

(71) Applicant: INOUE MFG., INC., Isehara-shi, Kanagawa-ken (JP)

(72) Inventors: Yoshitaka Inoue, Isehara (JP); Junichi Nagashima, Isehara (JP)

(73) Assignee: INOUE MFG., INC. (JP)

( * ) Notice: Subject to any disclaimer, the term of this patent is extended or adjusted under 35 U.S.C. 154(b) by 177 days.

(21) Appl. No.: 14/624,830

(22) Filed: Feb. 18, 2015

(65) Prior Publication Data
US 2016/0074826 A1 Mar. 17, 2016

(30) Foreign Application Priority Data
Sep. 11, 2014 (JP) ................................. 2014-184793

(51) Int. Cl.
| | | |
|---|---|---|
| *B01J 8/40* | (2006.01) | |
| *B01F 7/00* | (2006.01) | |
| *B01F 11/02* | (2006.01) | |
| *B01F 13/10* | (2006.01) | |
| *B01F 3/12* | (2006.01) | |

(52) U.S. Cl.
CPC ............... *B01J 8/40* (2013.01); *B01F 3/1221* (2013.01); *B01F 3/1242* (2013.01); *B01F 7/00816* (2013.01); *B01F 11/025* (2013.01); *B01F 13/103* (2013.01); *B01J 2208/00858* (2013.01)

(58) Field of Classification Search
CPC ............... B01J 8/40; B01J 2208/00858; B01F 7/00816; B01F 3/1242; B01F 13/103; B01F 3/1221; B01F 11/025; B01D 33/073; B01D 33/54; B03B 7/00; B07B 1/22; B07B 1/28; B07B 2230/04; C01P 2006/22; C01P 2006/19; C01P 2004/61; C01P 2006/12; C02F 1/72; C02F 1/32
See application file for complete search history.

(56) References Cited

U.S. PATENT DOCUMENTS 4,693,879 A * 9/1987 Yoshimura ........... B01D 33/073
209/270

FOREIGN PATENT DOCUMENTS

JP 2014 76441 5/2004

* cited by examiner

*Primary Examiner* — Walter D Griffin
*Assistant Examiner* — Cameron Allen
(74) *Attorney, Agent, or Firm* — Adams & Wilks

(57) ABSTRACT

A slurry treatment material containing solid particles mixed in liquid is finely pulverized, without using dispersion media, by flowing the treatment material into a vessel and through an annular fine gap formed between an inner wall of the vessel and an outer periphery face of a rotatable body mounted within the vessel. Rotation of the rotatable body subjects the treatment material to compression, expansion and shearing treatments. After passing through the annular fine gap, the treatment material flows into an ultrasonic chamber where it is irradiated with ultrasonic waves that break up and disintegrate agglomerated clumps of solid particles that may be present in the treatment material.

15 Claims, 2 Drawing Sheets

METHOD FOR TREATING SLURRY AND TREATMENT APPARATUS USED FOR THE SAME

FIELD OF THE INVENTION

The present invention relates to a method for treating slurry and a treatment apparatus used therefor, by which slurry containing solid particles mixed in a liquid can be finely pulverized without using dispersion media, such as beads or balls.

BACKGROUND INFORMATION

As used herein, "slurry" means a mixture of solid particles in a liquid, such as solid particles mixed in an oil- or aqueous-based liquid. Such slurries are used in various fields (chemistry, medicine, electronics, ceramics, foods, feed, etc.) and are mixed, kneaded and dispersed to obtain a slurry of finely divided particles dispersed generally uniformly in the liquid.

There have been known apparatuses for a mixing and kneading treatment or a dispersion treatment of slurry as a treatment material, particularly slurry having a low viscosity to a medium viscosity (1 to 100 dPa·s) without using dispersion media (beads or balls). For example, the treatment apparatus described in JP-A-2014-76441 comprises a vessel having a supply port and a discharge port for a slurry treatment material, a rotary body rotatably disposed in the vessel, and an annular fine gap formed between the inner face of the vessel and the outer periphery face of the rotary body and in which the treatment material flows, wherein notches are formed on the surface of the rotary body. The rotary body is in the form of a cylindrical body having projections that extend in the longitudinal direction of the cylindrical body and that are formed at circumferentially spaced intervals on the outer periphery face of the cylindrical body. By using this apparatus, it is possible to finely pulverize solid particles (powder) in the slurry. However, when the solid particles are a mixture of different materials (mixed solid materials) one of which is very fine nano powder, the powder has a tendency to agglomerate into clumps, and therefore insufficient fine pulverization sometimes occurs.

When agglomerates or clumps of powder are formed, it is worth considering the use of a bead mill. However, since the bead mill has such a structure that the treatment material is stirred with dispersion media (beads or balls) in a vessel to disperse the treatment material, the dispersion media may sometimes be abraded or broken by impact or friction caused by the stirring motion. Consequently contaminants formed by the abrasion or the break of the dispersion media may likely be incorporated into the treatment material thereby degrading the quality of the treated material. Particularly, when treating mixed solid particles containing nano particles, the treatment is carried out at a high circumferential speed, which causes the particles themselves to be damaged by the dispersion media, and therefore it has been difficult to homogenize the properties of the treated material. Further, if the temperature of the treatment material is raised during the dispersion treatment, the quality of the treated material is adversely affected.

SUMMARY OF THE INVENTION

It is an object of the present invention to provide a method and apparatus for treatment of slurry having a low to medium viscosity by conducting compression, expansion and shearing treatments without using dispersion media (beads or balls), by which it becomes possible to form a homogeneously dispersed treatment material free of clumps.

JP-A-2014-76441 has been filed by the present applicant and describes that it has been found possible to finely pulverize a treatment material by an annular-type wet dispersion apparatus without formation of clumps or agglomerates of powdery materials, but as mentioned above, in the case of a slurry treatment material having mixed solid materials one of which is very fine nano powder, it has still been insufficient in disintegrating the agglomerates. In a mixed solid materials system containing nano powder as one of the solid materials, since the agglomerating power of the powder is strong, there exists a need to find a method capable of further securely conducting fine pulverization. For this purpose, the present inventors have found a method of dispersion using ultrasonic wave irradiation in combination with a wet dispersion apparatus, by which impact forces are applied to disintegrate the agglomerated clumps. Namely, in a wet dispersion apparatus using no dispersion media, treatment material enters a vessel through an inlet, and when it passes through the vessel, it receives compression, expansion and shearing treatments, and flows towards an outlet side. If an ultrasonic-generating device is disposed near to the outlet and the treatment material is irradiated with ultrasonic waves, fine bubbles are formed by cavitation in the liquid of the treatment material. The fine bubbles rapidly collapse, producing shock waves that apply high impact forces to the agglomerates in the vicinity of the collapsed bubbles thereby disintegrating the agglomerates resulting in a homogeneous dispersion.

In the ultrasonic-generating device, the region where ultrasonic vibration is applied is mainly the front end portion of an ultrasonic horn. For the purpose of uniformly applying ultrasonic vibration to the treatment material, efficient dispersion cannot be made by simply disposing an ultrasonic-generating device in the vicinity of the outlet of the vessel. The present inventors' experiments have revealed that it is important to take into account the size of an outlet of a vessel relative to the size of a front end portion of an ultrasonic horn of an ultrasonic-generating device, and the distance between the side face of the ultrasonic horn and the wall face around the ultrasonic horn.

One aspect of the present invention relates to a method and apparatus for treating slurry, in which a previously mixed and kneaded viscous fluid slurry of a viscosity range of from a low viscosity to a medium viscosity (1 to 100 dPa·s) is mixed and kneaded, or dispersed without using dispersion media, in combination with an ultrasonic-generating device.

A further aspect of the present invention relates to a method for treating slurry comprising flowing a treatment material (slurry) which has entered though an inlet of a vessel into an annular fine gap formed between a rotatable body and an inner wall of the vessel; rotating the rotatable body to conduct compression, expansion and shearing treatments of the treatment material; discharging the treatment material which has passed through the annular fine gap from an internal flow-out port of the vessel to an ultrasonic chamber which has a discharge port; disposing an ultrasonic horn in the ultrasonic chamber at a distance of from 2 to 5 mm from a wall face of the ultrasonic chamber at the discharge port side and at a distance of from 2 to 5 mm from the internal flow-out port; and irradiating the treatment material flowing in the ultrasonic chamber with ultrasonic waves by use of the ultrasonic horn.

Another aspect of the present invention relates to an apparatus for treating slurry, comprising a vessel having a supply port and an internal flow-out port for a treatment material; a rotatable body disposed rotatably in the vessel; an annular fine gap formed between an outer periphery face of the rotatable body and an inner wall face of the vessel; an ultrasonic chamber disposed in communication with the internal flow-out port of the vessel and having a discharge port; and an ultrasonic horn disposed in the ultrasonic chamber, wherein the ultrasonic horn is disposed near to the discharge port side so that the distance between the ultrasonic horn and the internal flow-out port is 2 to 5 mm and the distance between the ultrasonic horn and a wall face of the ultrasonic chamber at the discharge port side is 2 to 5 mm.

According to another aspect of the present invention, the slurry is preliminarily mixed and kneaded to form a treatment material whose liquid has a low viscosity to a medium viscosity within a viscosity range of 1 to 100 dPa·s. The treatment material enters the vessel through the supply port, and flows into an annular fine gap formed between the rotatable body and the inner wall of the vessel. By rotation of the rotatable body, the solid particles in the treatment material are subjected to compression, expansion and shearing treatments and finely pulverized. When the treatment material which has passed though the annular fine gap flows into the ultrasonic chamber through the internal flow-out port, the treatment material is irradiated with ultrasonic waves by the ultrasonic horn to break up and disintegrate any remaining agglomerated clumps.

If the distance between the ultrasonic horn and the wall face of the ultrasonic chamber at the discharge port side, or the distance between the ultrasonic horn and the internal flow-out port, is 6 mm or more, clumps or agglomerates in the treatment material cannot be sufficiently disintegrated. If the distance from the ultrasonic horn to either the wall face of the ultrasonic chamber or the internal flow-out port is 1 mm or less, the temperature of the treatment material tends to rise, which is undesirable.

In the present invention, the distance between the ultrasonic horn and the wall face of the ultrasonic chamber at the discharge port side and the distance between the ultrasonic horn and the internal flow-out port are preferably set to be 2 to 5 mm. Since the ultrasonic horn is disposed close to the discharge port side, the ultrasonic vibration can strongly act on and be applied uniformly to agglomerated clumps that have not been finely pulverized by rotation of the rotatable body in close proximity to the annular fine gap. The clumps can thereby be securely disintegrated. Further, since no increase of temperature is observed, homogeneous dispersion can be made without adversely affecting the quality of the product. In addition, since no dispersion media (beads or balls) are used, the internal pressure of the vessel can be made low, and generation of contaminants by abrasion or the like of the dispersion media can be eliminated. Since a media-separating apparatus (separator) conventionally used in bead mills is not used, the dispersion treatment can be efficiently made at a low energy.

DETAILED DESCRIPTION OF THE PREFERRED EMBODIMENTS

Figure 1:
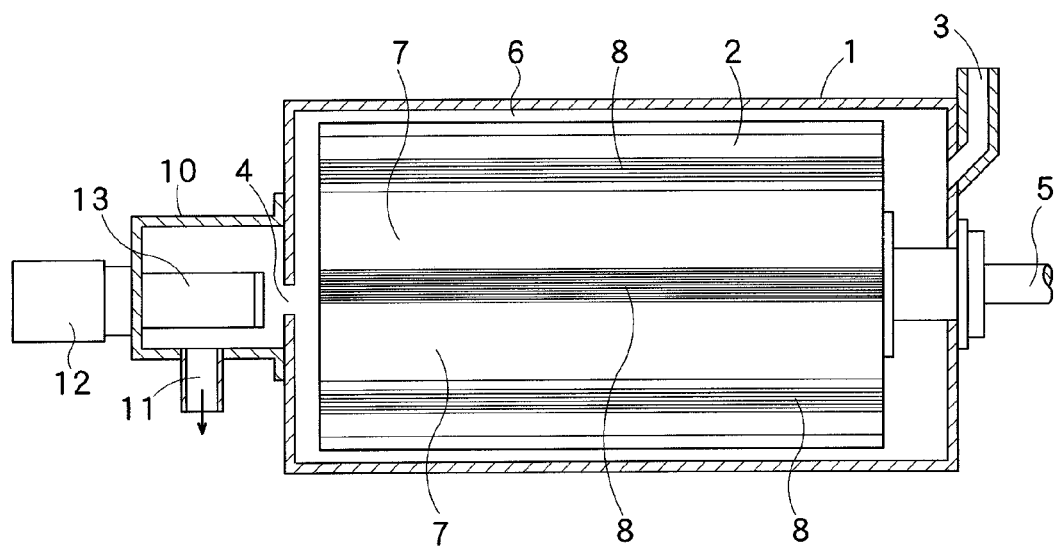
FIG. 1 is a cross-sectional front view of a treatment apparatus according to one embodiment of the present invention.

The present invention can be applied to fine pulverization of slurry (treatment material) in various fields such as chemistry, medicine, electronics, ceramics, foods or feed. As shown in FIG. 1, the treatment apparatus of the present invention has a vessel 1, preferably of cylindrical shape, and a rotatable body (rotor) 2 mounted to undergo rotation in the vessel. The vessel 1 has a supply port 3 which receives slurry composed of a pre-mixed and pre-kneaded treatment material and an internal flow-out port 4 through which the slurry flows out of the vessel. Although not shown in the drawings, a jacket through which circulates a temperature-controlling medium such as cooling water is disposed around the vessel 1. The rotatable body 2 is rotated by a driving shaft 5 connected to a driving motor (not shown).

An annular fine gap 6 is formed between an inner wall face of the vessel 1 and an outer periphery face of the rotatable body 2. The treatment material supplied into the vessel 1 from the supply port 3 flows into the annular fine gap 6. The size of the annular fine gap 6 is about 1.0 to 10 mm, preferably about 2.0 to 5.0 mm. The treatment material to be supplied into the vessel is optimally a viscous paste of from a low viscosity to a medium viscosity within a viscosity range of about 1 to 100 dPa·s.

Figure 2:
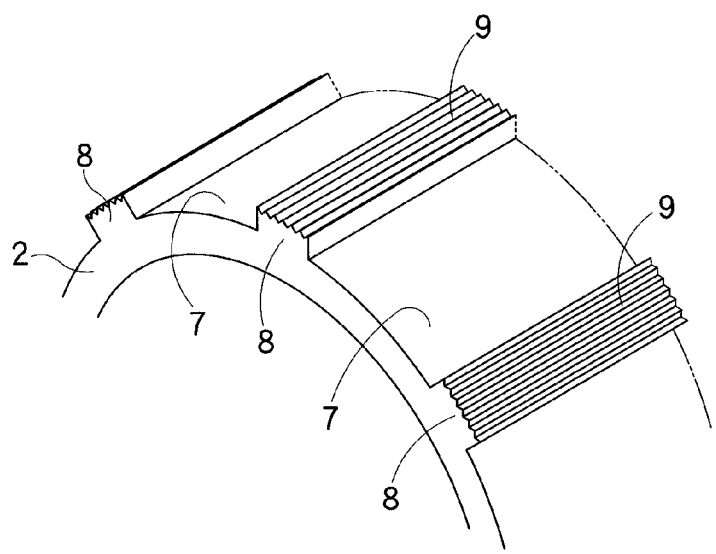
FIG. 2 is a partial perspective view showing an example of a rotatable body in the apparatus shown in FIG. 1.

The rotatable body 2 is formed in a tubular shape of circular cross section, and the treatment material continuously receives compression and shearing actions in the annular fine gap 6 by rotation of the rotatable body. Further, in this embodiment, as shown in FIG. 2, the outer periphery face of the rotatable tubular body 2 is provided with circumferentially spaced-apart projecting portions 8 that extend longitudinally along the length of the rotatable body 2. The projecting portions 8 are circumferentially separated from one another by arcuate portions 7 of the outer periphery face of the rotatable body 2 such that the arcuate portions 7 and the projections 8 are alternately arrayed in the circumferential direction around the outer periphery face of the rotatable body. Stated otherwise, the arcuate portions 7 constitute recessed portions alternately arrayed with the projecting portions 8.

By providing the outer periphery face of the rotatable body 2 with the alternating circumferentially spaced-apart and longitudinally extending arcuate portions 7 and projecting portions 8, the treatment material is subjected to compression and shearing actions at the projection portions 8 and release and expansion actions at the arcuate portions 7 between the projections portions 8. The compression and shearing actions and the release and expansion actions are repeatedly applied to the treatment material as the material flows from the supply port 3 side towards the internal flow-out port 4 side. Usual roll mills, in which a treatment material is dispersed by use of plural rolls, are generally considered to be an apparatus for dispersing a treatment material by applying compression, shearing and expansion actions to the material, and therefore the actions by the arcuate portions 7 and the projecting portions 8 may be regarded as actions similar to a dispersion treatment with a roll mill and make it possible to obtain fine and uniform pulverization of the treatment material.

Notches 9 may be formed on the surface of the rotatable body 2 or on the surface of the projecting portions 8 by a knurling process. The shape of the notches 9 may be formed to have horizontal lines, a parallel knurl form such as oblique lines, or a twill knurl form such as rectangular, cross or diagonal. Further, the fine projections formed by the notches are formed to have a height of about 1.0 to 0.1 mm, preferably about 0.6 to 0.3 mm.

An ultrasonic chamber 10 having a discharge port 11 is disposed opposite to the internal flow-out port 4 of the vessel 1. In the ultrasonic chamber 10, an ultrasonic horn 13 of an ultrasonic-generating device 12 is disposed, and treatment material flowing into the ultrasonic chamber 10 is irradiated with ultrasonic waves emitted from the ultrasonic horn 13.

Figure 3:
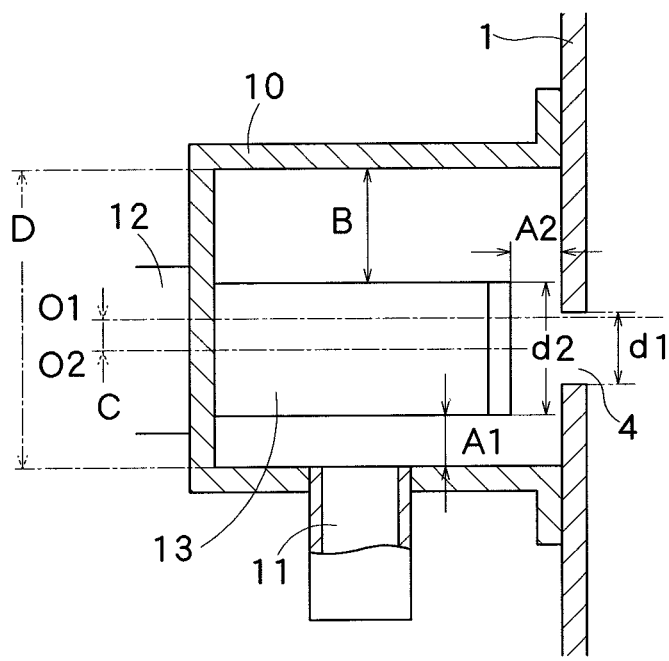
FIG. 3 is an explanatory view of an ultrasonic chamber in the apparatus shown in FIG. 1.

As shown in FIG. 3, the distance A1 between the side face of the ultrasonic horn 13 at its discharge port 11 side and the inner wall of the ultrasonic chamber 10 at its discharge port 11 side, and the distance A2 between the front end of the ultrasonic horn 13 and the internal flow-out port 4, are preferably within the range of about 2 to 5 mm. In the embodiment illustrated in FIG. 1, the distances A1 and A2 are adjusted to be the same. It should be noted that the distances A1 and A2 need not be equal though each should preferably be within the range 2 to 5 mm. By irradiating the treatment material with ultrasonic waves, cavitation bubbles are formed in the liquid of the treatment material.

The optimum amplitude of ultrasonic waves for generating fine bubbles by cavitation depends on the type of liquid of the treatment material. It is known that cavitation is caused easily in a liquid of the treatment material that has a large surface tension. In general, when the liquid is of a solvent type, the surface tension is as low as roughly 20 to 30 mN/m, and therefore cavitation is hardly generated. On the other hand, when the liquid is of an aqueous type, the surface tension is 73 mN/m, and therefore cavitation is easily generated. For example, if the output of the ultrasonic-generating device 12 is 600 W, the frequency is 20 kHz, the diameter at the front end portion of the ultrasonic horn 13 is 36 mm and the amplitude of vibration is 14 to 40 μm, cavitation is always generated regardless of the amplitude value. The larger the amplitude is, the stronger the impact force is when the fine cavitation bubbles collapse. The clumps or agglomerates of treatment material can be broken up and disintegrated by the impact forces.

The internal flow-out port 4 has an orifice through which the treatment material flows out, and the orifice is preferably formed in a shape similar to the shape of the confronting front end portion of the ultrasonic horn 13. The diameter of the internal flow-out port 4 is preferably formed to be smaller than the size of the front end portion of the ultrasonic horn 13 so that the treatment material flowing out of the internal flow-out port 4 can be appropriately irradiated with ultrasonic waves. According to the results of experiments, the diameter d1 of the internal flow-out port 4 is desirably about 80% of the diameter d2 of the front end portion of the ultrasonic horn 13. If d1 is formed larger than this level, the presence of clumps or agglomerates is observed in the treatment material discharged from the discharge port 11. At most, d1 is up to the same level as the diameter of the front end portion of the ultrasonic horn.

With this structure, when the ultrasonic horn generates vibration of about 20 kHz, i.e., 20,000 times per second, ultrasonic waves are emitted from the front end portion of the ultrasonic horn. The ultrasonic waves are transferred to the entire liquid flowing out of the internal flow-out port 4 and therefore fine vacuum bubbles are formed in the liquid by cavitation and the bubbles rapidly collapse and produce shock waves in the liquid. The shock waves effectively break up and disintegrate the clumps resulting in a homogeneously dispersed treatment material free of clumps.

If the ultrasonic horn 13 is disposed at the central position of the ultrasonic chamber 10, the treatment material may undesirably flow out without receiving the ultrasonic treatment by a so-called short pass. Namely, if the position of the discharge port 11 is close to the position of the internal flow-out port 4 in the ultrasonic chamber 10, and if the distance between the front end portion of the ultrasonic horn 13 disposed at the central position of the ultrasonic chamber 10 and the internal flow-out port 4 is equal to the distance between the side face of the ultrasonic horn 13 and the discharge port 11, the treatment material tends to undergo short pass from the internal flow out port 4 to the discharge port 11. On the other hand, if the ultrasonic horn 13 is disposed eccentrically to the center O1 of the ultrasonic chamber 10 so that the distance B between the side wall of the ultrasonic horn 13 on the opposite side to the discharge port 11 and the inner face of the ultrasonic chamber becomes greater than the distance A1 between the side face of the ultrasonic horn 13 at the discharge port 11 side and the discharge port 11, the flow resistance is lowered and control can suitably be made without formation of short pass. This structure will be explained below.

As illustrated in FIG. 3, the distance A1 between the side face of the ultrasonic horn 13 at the discharge port 11 side and the inner wall of the ultrasonic chamber 10 is shorter than the distance B between the side face of the ultrasonic horn 13 on the opposite side to the discharge port 11 and the inner wall of the ultrasonic chamber 10. As the eccentric position preferred for stir-flowing properties, when the diameter of the ultrasonic chamber is D, the distance C from the center O1 of the ultrasonic chamber to the center O2 of the ultrasonic horn is represented by C=0.2 D to 0.25 D.

EXAMPLES

An aqueous material for an anode of a lithium ion secondary battery, which is a mixture of an aqueous solvent and an electrode material containing nano powder (mixed solid materials), was subjected to premixing with a mixer to prepare a slurry liquid. This slurry liquid contained a powder of nano powder. An apparatus the same as shown in FIG. 1 was used with an ultrasonic device having an output of 600 W, a frequency of 20 kHz, a diameter at the front end portion of the ultrasonic horn of 36 mm, an amplitude of vibration of 40 μm, and a diameter at the internal flow-out port of 28 mm. By changing, in mm increments, the distance A1 between the side face of the ultrasonic horn at its discharge port side and the inner wall of the ultrasonic chamber and the distance A2 between the front end of the ultrasonic horn and the internal flow-out port, the extent to which agglomerated clumps contained in the treatment material was pulverized was observed. Concurrently, the presence or absence of the rise of temperature of the treatment material discharged from the discharge port was observed. The results of the test are indicated in Table 1 below.

TABLE 1

| | A1, A2 (mm) | | | | | | |
|---|---|---|---|---|---|---|---|
| | 1 | 2 | 3 | 4 | 5 | 6 | 10 |
| Disappearance of agglomerated clumps | ○ | ○ | ○ | ○ | ○ | X | X |

TABLE 1-continued

| | A1, A2 (mm) | | | | | | |
|---|---|---|---|---|---|---|---|
| | 1 | 2 | 3 | 4 | 5 | 6 | 10 |
| Temperature of treatment material | X | Δ | ○ | ○ | ○ | ○ | ○ |

Evaluation:
Disappearance of partial agglomerates ○ . . . disappeared X . . . not disappeared
Temperature of treatment material ○ . . . no rise of temperature Δ . . . a little rise of temperature X . . . rise of temperature

COMPARATIVE EXAMPLES

An aqueous material for an anode of a lithium ion secondary battery, the same as used in the foregoing Examples, was subjected to premixing with a mixer to prepare a slurry liquid. As a treatment apparatus, an apparatus the same as illustrated in FIG. 1 was used except that the ultrasonic chamber was removed. In the treated material discharged from the vessel, agglomerated clumps remained and were easily recognized.

As mentioned above, by conducting the dispersion treatment with the ultrasonic chamber disposed at the discharge side of the vessel, it becomes possible to extinguish clumps present in the treatment material discharged from the vessel.

Particularly, when the ultrasonic horn is arranged so that the distance A1 between the side face of the ultrasonic horn at its discharge port side and the inner wall of the ultrasonic chamber and the distance A2 between the front end of the ultrasonic horn and the internal flow-out port are about 2 to 5 mm, preferably 3 to 5 mm, the clumps are disintegrated and at the same time, the temperature of the treatment material is not raised. By these advantages, the treatment material can be uniformly dispersed without degradation of the quality of the treatment material.

It will be appreciated by those skilled in the art that obvious changes and modifications can be made to the embodiments described in the foregoing description without departing from the broad inventive concept thereof. It is understood, therefore, that this disclosure is not limited to the particular embodiments disclosed, but is intended to cover all obvious changes and modifications thereof which are within the scope and spirit of the disclosure as defined by the appended claims.

What is claimed is:

1. A method for treating slurry treatment material, comprising the steps: flowing a treatment material containing solid particles mixed in liquid through an inlet of a vessel into an annular fine gap formed between a rotatable body and an inner wall of the vessel; rotating the rotatable body to conduct compression, expansion and shearing treatments of the treatment material in the annular fine gap; discharging the treatment material which has passed through the annular fine gap from an internal flow-out port of the vessel to an ultrasonic chamber which has a discharge port; disposing an ultrasonic horn in the ultrasonic chamber at a distance of from 2 to 5 mm from a wall face of the ultrasonic chamber at the discharge port side and at a distance of from 2 to 5 mm from the internal flow-out port; and irradiating the treatment material flowing in the ultrasonic chamber with ultrasonic waves by use of the ultrasonic horn.

2. A method according to claim 1; wherein the disposing step comprises disposing the ultrasonic horn eccentrically to the center of the ultrasonic chamber towards the discharge port side.

3. A method according to claim 1; wherein the disposing step comprises disposing the ultrasonic horn at the same distance from both the wall face of the ultrasonic chamber and the internal flow-out port.

4. A method according to claim 1; wherein the flowing step comprises flowing a treatment material containing solid particles mixed in liquid, wherein the liquid has a viscosity range of 1 to 100 dPa·s.

5. A method according to claim 1; wherein the rotating step is carried out without using dispersion media.

6. A method according to claim 1; wherein the irradiating step comprises irradiating the treatment material with ultrasonic waves to create, in the liquid of the material, cavitation bubbles that collapse and produce shock waves effective to disintegrate agglomerated clumps of solid particles present in the treatment material.

7. A method according to claim 6; wherein the treatment material comprises a mixture of solid particles of different materials mixed in liquid.

8. A method according to claim 6; wherein the treatment material contains nano powder.

9. An apparatus for treating slurry treatment material, comprising: a vessel having a supply port for supplying slurry treatment material into the vessel and an internal flow-out port for discharging the slurry treatment material from the vessel; a rotatable body disposed rotatably in the vessel so as to form an annular fine gap between an outer periphery face of the rotatable body and an inner wall face of the vessel, the outer periphery face of the rotatable body being provided with circumferentially spaced-apart projecting portions that extend longitudinally along the length of the rotatable body, wherein rotation of the rotatable body conducts compression, expansion and shearing treatments of the slurry treatment material in the annular fine gap; an ultrasonic chamber disposed in communication with the internal flow-out port of the vessel and having a discharge port; and an ultrasonic horn disposed in the ultrasonic chamber, wherein the ultrasonic horn is disposed near to the discharge port side so that the distance between the ultrasonic horn and the internal flow-out port is 2 to 5 mm and the distance between the ultrasonic horn and a wall face of the ultrasonic chamber is 2 to 5 mm.

10. The apparatus according to claim 9; wherein the center of the ultrasonic horn is located eccentrically to the center of the ultrasonic chamber towards the discharge port side.

11. The apparatus according to claim 9; wherein notches are formed on the surface of the projecting portions of the rotatable body.

12. The apparatus according to claim 9; wherein the annular fine gap is free of dispersion media during use of the apparatus.

13. The apparatus according to claim 9; wherein the ultrasonic horn is disposed at the same distance from both the wall face of the ultrasonic chamber and the internal flow-out port.

14. The apparatus according to claim 9; wherein the rotatable body has arcuate portions and projecting portions alternately arrayed in the circumferential direction around the outer periphery face of the rotatable body.

15. The apparatus according to claim 14; wherein the arcuate portions and the projecting portions extend longitudinally along substantially the entire length of the rotatable body.

* * * * *